United States Patent Office

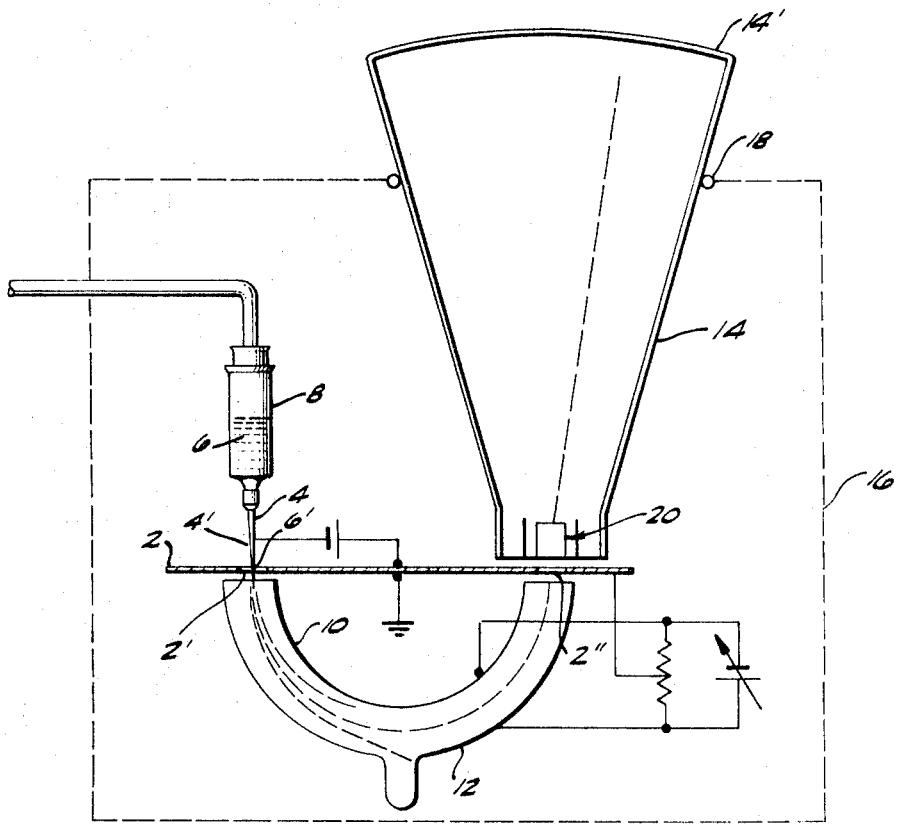

3,591,404
Patented July 6, 1971

3,591,404
METHOD OF MAKING VIEWING SCREENS FOR CATHODE RAY TUBES
Hans W. Heil and Burton W. Scott, Malibu, Calif., assignors to Hughes Aircraft Company, Culver City, Calif.
Filed Dec. 23, 1968, Ser. No. 786,296
Int. Cl. H01j 31/20
U.S. Cl. 117—17.5   7 Claims

ABSTRACT OF THE DISCLOSURE

Method of obtaining an electrically energized stream having the same energy per unit charge and containing phosphor material for use in fabricating a viewing screen for a cathode ray tube wherein the base member for the viewing screen is scanned with the phosphor-containing stream.

---

This invention relates to cathode ray tubes or kinescopes and for methods for making or viewing phosphor screens therefor. More particularly, the invention relates to methods for laying down a desired pattern of mosaic of phosphor materials which pattern may be composed of a repetitious arrangement of different color-producing phosphor materials.

The method of the invention is especially useful in the fabrication of color kinescopes for use in color television receivers wherein the selection of the color phosphor to be excited into luminescence by being impacted by a scanning electron beam is achieved with the aid of a mask or an array of grid wires, in particular where an electric field is utilized with the mask or array of grid wires for the purpose of focusing elements of the scanning electron beam to a smaller size when they arrive at the viewing screen. In this latter application the presently used optical printing methods, which rely on shadow casting, fail for two reasons. First, individual mask openings are usually too large to obtain a printed phosphor element of the correct size. Secondly, the electrons travel in curved trajectories during operation due to the electric field, whereas the light rays travel rectilinearly; therefore, the phosphor elements as printed by the light rays will be at the wrong locations.

In describing the present invention the terms "beam potential" or "droplet potential" are employed herein. It should be understood that these terms are intended to have the same meaning which is defined as the kinetic energy of the droplet of particles in the beam divided by the individual charge. Thus, with the energy being expressed in joules, the charge in coulombs, the droplet potential is indicated in volts.

It has been previously proposed to fabricate viewing screens for cathode ray tubes by forming an electrically charged stream of phosphor material and directing or scanning such a stream as by electron optical techniques across the substrate or faceplate of a cathode ray tube in accordance with a desired phosphor deposition pattern. Such a stream is described in the copending application of Hans W. Heil, S.N. 575,129, filed Aug. 25, 1966, now U.S. Pat. No. 3,479,711, and in the copending application of Burton W. Scott, S.N. 681,067, filed Nov. 3, 1967, both assigned to the instant assignee. The present invention relates especially to a method for obtaining an energized stream of uniform droplet potential and containing phosphor material for use in such viewing screen fabrication techniques as described in these copending applications.

In order to "print" a viewing screen with phosphor material by means of a scanning stream composed of electrically charged phosphor particles and/or discrete volumes (droplets) of a suspension of an electrically conductive fluid containing phosphor material, it is necessary that the discrete volumes or droplets or the phosphor particles be given an electrical charge, generally great enough to result in an effective charge-to-mass ratio so that particles or droplets are independent of gravitational forces. In practice, such on electrical charge is obtained by applying an electric field to the surface of a suspension of electrically conductive fluid in which phosphor material is dispersed, for example, and thereby or thereafter causing the ejection of a stream of such charged droplets into an electron optical system whereby the stream of droplets may be deflected, accelerated and focused as desired. It will be appreciated that the attainment of a stream of electrically energized droplets or discrete volumes of uniform beam potential and containing phosphor material is extremely significant in permitting one to obtain a precise and accurate control of both the size and the location of the phosphor pattern to be printed. As explained in the aforementioned copending applications, one of the objects for depositing phosphor materials in accordance with the techniques described therein is to obtain a final deposition pattern, the position of which is determined by charged particle trajectories substantially coincident with the trajectories followed by an electron beam or beams in the operation of the cathode ray tube. To achieve such a result requires that the phosphor particles or droplet potential, U, be substantially identical or uniform for positions are assured which are identical to those of the electrons. It has been observed that such particles or droplets do not have a uniform potential and that the particle potential in one and the same beam may vary by many hundreds of volts. While the average potential has been found to be usually less than the potential difference between the droplet source and the viewing screen, it has also been found to exceed that voltage. The reason for this particular phenomenon is not fully understood but is believed to be found in the complex phenomena which occur as each individual droplet is formed and "tears-off" at the tip of the source thereof and begins its flight in space toward the viewing screen. The non-uniform particle potential may also be due to a loss in mass as by evaporation or to a loss of charge during flight.

It is therefore an object of the present invention to provide an improved method for forming phosphor screens for cathode ray tubes.

Another object of the invention is to provide an improved method for depositing phosphor materials on the viewing screen or faceplate of a cathode ray tube.

Yet another object of the invention is to provide an improved method for depositing phosphor materials on the viewing screen or faceplate of a cathode ray tube in a pattern which is determined by charged particle trajectories substantially coincident with the trajectories followed by electron beams in the operation of the cathode ray tube.

Still another object of the invention is to provide an improved method for depositing phosphor materials on the viewing screen or faceplate of a cathode ray tube by scanning the faceplate with a stream of electrically energized droplets of substantially uniform beam potential and containing phosphor material.

Another object of the invention is to provide an improved method for obtaining a stream of electrically energized droplets of uniform potential containing phosphor material for use in the fabrication of the viewing screen or faceplate of a cathode ray tube.

These and other objects and advantages of the invention are achieved by forming a "raw" or insufficiently uniformly energized stream of droplets containing phosphor material and directing this stream to traverse an orbit of 180° in an electric field having a predetermined potential distribution. By properly adjusting the gradient of the electrical field, droplets having a potential smaller or larger than a predetermined desired potential cannot be maintained in the 180° orbit which passes through an exit aperture in the system. Droplets of the desired potential, however, maintain the requisite orbital path and exit from the aperture to enter an appropriate electrode system whereby such uniform potential droplets may be deflected and accelerated or caused to scan the faceplate or viewing screen of a cathode ray tube in any predetermined and controlled fashion.

The invention will be described in greater detail by reference to the drawings in which the sole figure is a partially schematic view in elevation suitable for practicing the method of the invention.

With reference to the drawings, a viewing or phosphor screen is fabricated according to the invention by preparing a fluid suspension comprising a substantially electrically conducting fluid, capable of being charged electrically, in which is dispersed comminuted phosphor material capable of producing the desired colored light when bombarded by electrons in a completed tube. This suspension is prepared by thoroughly mixing the phosphor material with electrically conductive fluid, the phosphor material constituting 10 to 20% by weight of the total mixture, for example. The phosphor materials used are those readily available from commercial suppliers and may be the same as used in the present day cathode ray tubes. The phosphor materials may be used directly as obtained from the manufacturer without further processing. The phosphor particle size is not crucial and the only factors that need be observed as far as particle size is concerned are the size of the orifice from which the suspension will ultimately be discharged and the desirability of avoiding particle sizes of such magnitude as to result in rapid settling out in the fluid suspension. This latter factor merely imposes a limit on the time between preparing and using the suspension. In general, the particle size of commercially available phosphor materials is from 5 to 10 microns and as such the particle size poses no problems as to settling out or clogging up the discharge orifice.

The fluid in which the phosphor material is to be suspended should be electrically conductive. Additives to the fluid may be used to enhance the conductivity of the fluid if desired or needed. The electrical conductivity of the fluid is significant in that electrical charging of the fluid suspension is facilitated thereby. In addition, the fluid desirably should not be reactive with or detrimental to the phosphor materials. Other desirable but not critical characteristics of the fluid are a low vapor pressure which permits its use in vacuum without undue complication or difficulty, and a high viscosity which facilitates keeping the phosphor particles in suspension. Typically satisfactory fluids which have been used in the practice of the invention are such fluids as 2-ethyl hexyl phthalate and glycerin. Demonstrative of the fact that the precise extent of electrical conductivity of the fluid is not critical is the conductivity (or resistivity) of these two fluids which is, respectively, $4 \times 10^9$ ohm-cm. and $5 \times 10^6$ ohm-cm. The fluid should be out-gassed either before and/or after mixing with the phosphor material in order to minimize gas bubbling therefrom during vacuum pump-down. Out-gassing of the fluid may be easily achieved by storing the fluid in a dessicator in vacuum for several hours. As used herein the term "suspension" is intended to mean a fluid containing suspended phosphor materials.

The next step is to form electrically charged droplets of the suspension and then a collimated stream of uniformly energized droplets of the suspension, which stream may be ultimately controllably directed, as by electrostatic deflection means, toward a substrate or faceplate upon which it is desired to deposit phosphor material. One way of forming and electrically charging droplets of the suspension is to establish an electric field between a surface of the suspension and an electrode member adjacent thereto.

This may be accomplished by disposing an apertured electrically conductive plate 2 of metal, for example, adjacent the orifice 4' from which a suspension 6 is to be drawn into droplets. The orifice 4' may be constituted by an aperture in the end 4 of the vessel 8 in which the suspension is contained. The end 4, at least, of this vessel may be of electrically conductive material, such as stainless steel, to facilitate establishment of the requisite electric field as by impressing a potential of 2,500 volts positive thereon with respect to the electrode plate 2. The aperture 2' in the electrode plate 2 may be aligned with the orifice 4' in the end 4 of the vessel 8 so that a stream 6' of charged droplets may pass therethrough.

The forming and charging of these droplets appears to be explained as follows. When an electrically conductive liquid is subjected to an electric field as at the end of a conductive tube, a charge builds upon the surface of the liquid. This charge is attracted away from the surface of the fluid with the consequence that simultaneously a propulsion in the forward direction and a constriction of the fluid column occurs. It is well known that a cylindrical column of fluid is unstable and breaks up into drops after some distance of travel. Because of the presence of the electric field, the droplets fly off in a charged state. In the process of the invention the charged droplets contain solid phosphor material suspended therein. The maximum charge, Q, that can be carried by a droplet is largely determined by the Rayleigh limit which stipulates the largest charge that can be placed onto a droplet before it flies apart. For the typical sized droplets used in the process of the present invention (e.g., 50 microns in diameter), this limit is about 0.05 C. kg.$^{-1}$, where C is the charge in coulombs and kg. is the mass of the droplet.

It will be understood that it is desired to scan the faceplate of a cathode ray tube by a stream of charged droplets of the suspension so that phosphor material may be deposited on the faceplate at points thereof which will be impinged by a scanning electron beam during operation of the tube. This means, therefore, that the trajectory of the droplets must be substantially identical to the trajectory of an electron. To realize this condition the "particle" or droplet potential, U, must be nearly identical for all droplets just as the beam potential (i.e., the ratio of energy to charge) of electrons originating at a particular cathode surface are substantially the same. The particle or droplet potential, U, at a given position is more precisely defined as the kinetic energy of the particle, E, at that point divided by the charge of that particle or droplet, $g$:

$$U = E/g$$

It has been found that the droplet potential on different droplets formed in the same stream may vary by many hundreds of volts. The reason for this phenomenon may be found in the complex actions taking place when each droplet "tears" off at the tip of the orifice 4'; it may also be due to a decrease in mass by evaporation or a loss of charge during flight. At any rate, it is clear that precisely printed phosphor viewing screens require fabrication by the process of the invention with droplets of uniform beam potential.

According to the present invention the "raw" phosphor-droplet stream is subjected to an electrical filtering operation to provide an output stream of phosphor droplets having a desired uniform potential. This filtering or selection action is achieved by having the droplets perform a 180° orbit in an electric field having a gradient which is inversely proportional to the square of the radius of curvature. Droplets of the desired potential will traverse the 180° orbit between the entrance and exit points of the electric field. Droplets having too small or too large a beam potential cannot maintain the 180° orbit and drift off course and may be collected for possible re-use.

The apparatus for accomplishing such energy selection may comprise a pair of hemispheres 10, 12 constructed of glass, for example, and rendered conductive by means of a graphite coating (not shown) applied thereto. These hemispheres are arranged concentrically with respect to each other and positioned with respect to the electrode plate 2 so that one end of the 180° channel formed between the hemispheres is positioned adjacent to and symmetrical with respect to the entrance aperture 2″ in the electrode plate 2. The other or exit end of the channel formed between the two hemispheres 10, 12 is disposed adjacent and symmetrically with respect to the exit aperture 2″ in the electrode plate 2. Positioned over the exit 2″ in the aperture plate 2 is the funnel portion 14 of a cathode ray tube having a faceplate portion 14′ on the annex surface of which it is desired to form a desired pattern of phosphor material. The droplet-forming and electrical selection means as well as the neck portion of the cathode ray tube funnel 14 are disposed in a vacuum system indicated generally by means of dashed lines 16. A vacuum type seal between the funnel portion 14 of the cathode ray tube and the vacuum system may be achieved by means of the well-known O-ring gasket structure 18.

Disposed within the neck portion of the funnel portion of the cathode ray tube is an electrostatic deflection system 20 comprising two pairs of plates, with the plates of each pair being parallel to and coextensive with each other and orthogonally disposed with respect to the plates in the other pair. By means of appropriate potentials applied to the respective plates, a charged particle beam such as the stream of phosphor-containing-droplets or an electron beam may be deflected orthogonally across the faceplate 14′ of the cathode ray tube.

In a typical operation of the apparatus shown in the drawing, a phosphor droplet stream having an average droplet potential, U, of 1.0 kv. was obtained as follows. A droplet stream from a nozzle 4 was obtained while maintaining a potential difference of +2.5 kv. between the nozzle 4 and the electrode or extraction plate 2. Hemisphere members 10, 12 were maintained at potentials of −200 volts and +200 volts, respectively. In general, the aperture or extraction plate 2 is maintained at a potential between the potential of the two hemispheres. In the example described herein the hemisphere 10 maintained at −200 volts had a radius of 2.0 inches, while the hemisphere 12 maintained at +200 volts had a radius of 2.5 inches. Under these operating conditions a phosphor stream having average potential of 1 kv. was obtained from the exit aperture 2″ in the electrode plate 2. Selection of the desired droplet potential is accomplished by the application of the proper potential differences to the two hemisphere members 10, 12 while resolution of the energy may be adjusted by making the apertures smaller or larger. A detailed description of the relationships involved in the energy selection apparatus shown in the drawings is set forth in an article by Kuyatt and Simpson entitled "Electron Monochromator Design," Review of Scientific Instruments (volume 38, No. 1) of January 1967, at page 103.

It will be appreciated that a high quality color phosphor screen for use in color television tubes, for example, requires a rather sharp transition between the phosphor areas and the areas therebetween. Such sharp transitions or edges may be obtained on viewing screen members for use in post-acceleration cathode ray tubes by means of a very sharply focused phosphor droplet stream which is wobbled to cover the desired area. For such viewing screen targets, it is necessary that the post-focused stream be very sharp—about 10 times smaller than the area to be covered. Such very sharp focus is only possible if there is a high degree of uniformity in the droplet energy, such as achievable by means of the present invention.

While the practice of the invention has been described with particular reference to the utilization of a stream of charged fluid droplets containing phosphor material, it should be understood that the practice of the invention is not limited thereto. The phosphor screen printing method described in the copending application of Hans Heil, S.N. 575,129 filed Aug. 25, 1966, and assigned to the instant assignee, may also employ the techniques of the present invention to advantage. Thus in accordance with this aforementioned copending application a stream of electrically charged phosphor material, not suspended in any fluid or droplets thereof, may be utilized and a high degree of uniformity in particle energy may be achieved in the same manner as described herein in connection with the stream of charged fluid droplets containing phosphor material.

There thus has been described a novel and extremely useful method of forming a phosphor viewing screen on a substrate wherein a stream containing discrete electrically charged volumes including phosphor material is caused to traverse a curved path in an electric field having a predetermined potential gradient so as to "filter out" any discrete volumes not having a desired electrical charge.

What is claimed is:

1. In the method of making a phosphor viewing screen on a substrate by forming a stream of electrically charged particles containing phosphor material and selectively directing said stream of particles to a predetermined point on said substrate, the improvement comprising: prior to directing said stream to said predetermined point on said substrate the step of filtering said stream by passing said stream through an electric field having a predetermined potential gradient whereby the unwanted particles are separated from the wanted particles which continue along the stream path.

2. The invention according to claim 1 wherein said particles include an electrically conductive fluid containing phosphor material.

3. The method according to claim 1 wherein said particles consist essentially of phosphor material.

4. The method according to claim 1 wherein said stream traverses a substantially semicircular path in said electric field.

5. The method according to claim 1 wherein the filtering step is accomplished by passing the stream of charged particles through an electric field which separates the wanted particles from the unwanted particles according to their individual potentials.

6. The method according to claim 1 wherein the path of said stream is curved and said path is determined by the electric field.

7. The method according to claim 5 wherein the unwanted particles are deflected away from the substantially wanted particles by the electric field leaving substantially all of the wanted particles to traverse the stream path.

References Cited

UNITED STATES PATENTS 2,787,556  4/1957  Haas _____ 117—33.5X
3,060,429  10/1962  Winston _____ 117—33.5X ALFRED L. LEAVITT, Primary Examiner W. F. CYRON, Assistant Examiner U.S. Cl. X.R.

96—1; 117—17, 33.5, 93.44